INVENTOR.
JOSEPH W. DEVORSS, Jr.
BY
William L. Epes
ATTORNEY

Nov. 22, 1949  J. W. DEVORSS, JR  2,488,968
FLEXIBLE DIAPHRAGM SEAL
Filed Feb. 5, 1948  2 Sheets-Sheet 2
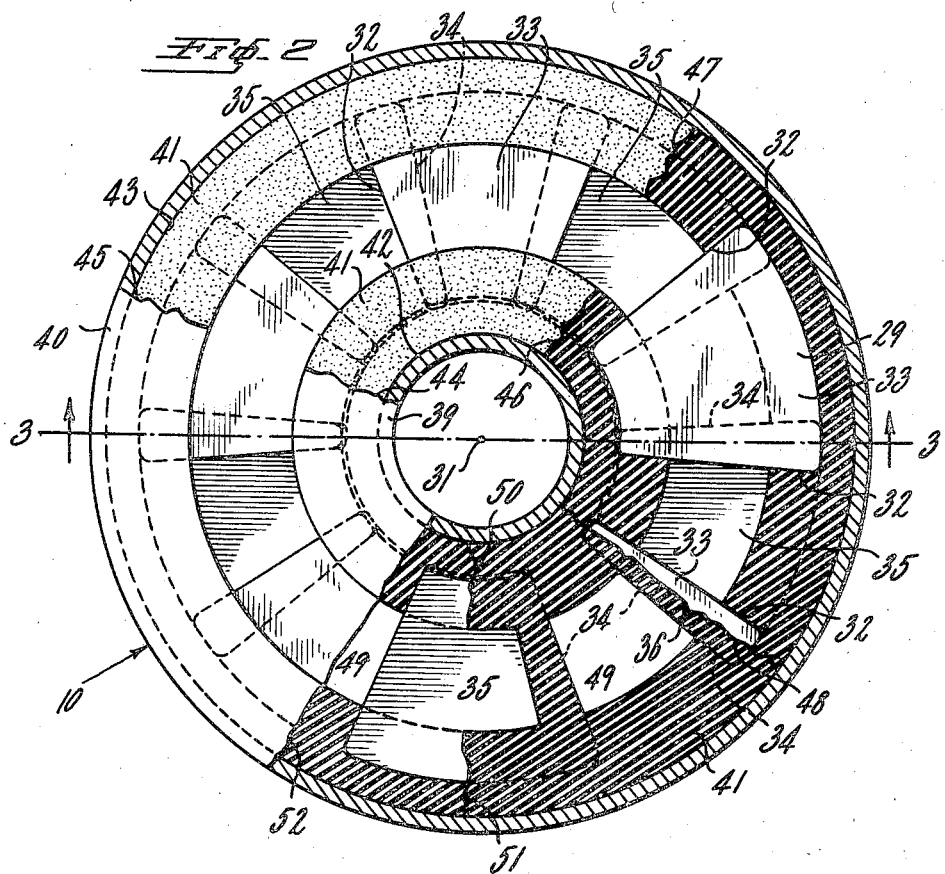
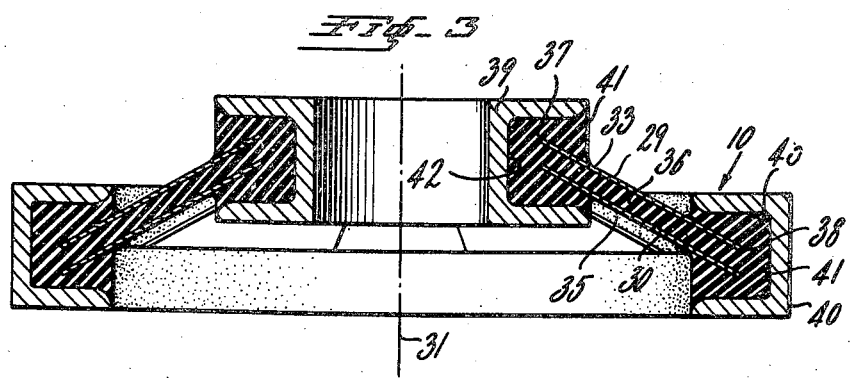
INVENTOR.
JOSEPH W. DEVORSS, Jr.
BY
William R. Eper
ATTORNEY Patented Nov. 22, 1949

2,488,968

UNITED STATES PATENT OFFICE 2,488,968

FLEXIBLE DIAPHRAGM SEAL

Joseph W. Devorss, Jr., Washington, D. C., assignor to United States Rubber Company, New York, N. Y., a corporation of New Jersey Application February 5, 1948, Serial No. 6,531

4 Claims. (Cl. 288—2)

This invention relates to an improved flexible diaphragm seal comprising overlapping reinforcing or load carrying members radiating from the axis of the diaphragm and bonded together by elastic rubber-like material interposed between the overlapping radially extending edges of the members.

The flexible diaphragm seal embodying this invention is particularly useful for withstanding relatively high pressure per square inch imposed thereon by fluid in contact therewith. The diaphragm seal may be used as diaphragm pistons in fluid pressure motors, pumps and other power generating or power transmitting apparatus, including diaphragm seals in pressure responsive devices and as a substitute for packing glands used around reciprocating members which pass through the walls of pressure chambers from the low pressure side to the high pressure side. Heretofore diaphragm seals have been made of flexible rubber compositions with and without reinforcing elements for the foregoing purposes. The diaphragm material in diaphragms of the usual construction is stressed in tension by the load imposed thereon, regardless of whether the diaphragm is made of rubber with or without reinforcing elements. The flexible rubber composition with or without the reinforcement when stressed in tension does not possess sufficient tensile strength to withstand the very high pressures per square inch imposed thereon for some applications. Attempts have been made to relieve the flexible sealing material used in the diaphragms from the injurious tensile stresses by so supporting the flexible material that it will be subjected to compression over the major portion of its area, as in the example illustrated in the United States patent to Brendlin No. 2,173,678. In that construction, reinforcing sector-shaped radiating metal plates were employed in the diaphragm to relieve the tension on the flexible sheet sealing material which covered the plates. However, the plates did not overlap, and the flexible covering material was exposed in the spaces between the plates to tension stresses. The areas under tension were weak spots and were liable to rupture.

An object of the present invention is to increase the capacity of diaphragm seals to withstand greater pressure per square inch, without sacrificing suitable flexing characteristics. Such results are accomplished by building the diaphragm of layers of reinforcing plates which radiate from and around the axis of the diaphragm. The edges of each plate of one layer overlap the edges of the opposite plate in the adjacent layer, and an elastic rubber-like sealing material is interposed between and bonded to the overlapping surfaces of the layers of plates. The elastic rubber-like material also extends around and is bonded to the inner and outer peripheries of the assembled layers of plates and to the rubber-like material interposed therebetween. In this improved construction, the load imposed on the diaphragm by the fluid pressure acting thereon is carried by the plates, which act in the manner of beams supported at each end. The rubber-like sealing material in the supporting frame of the plates is subjected to compression stresses and when so stressed it has a greater resistance to rupture than when subjected to tension stresses as in prior constructions.

This invention is further described in reference to the accompanying drawings, in which:

Fig. 2 is an enlarged plan view of the diaphragm seal, with parts broken away; and Fig. 3 is a cross-sectional view of the diaphragm seal taken on line 3—3 of Fig. 2, and showing the diaphragm in the position it occupies when molded and in its fully expanded position.

Figure 1:
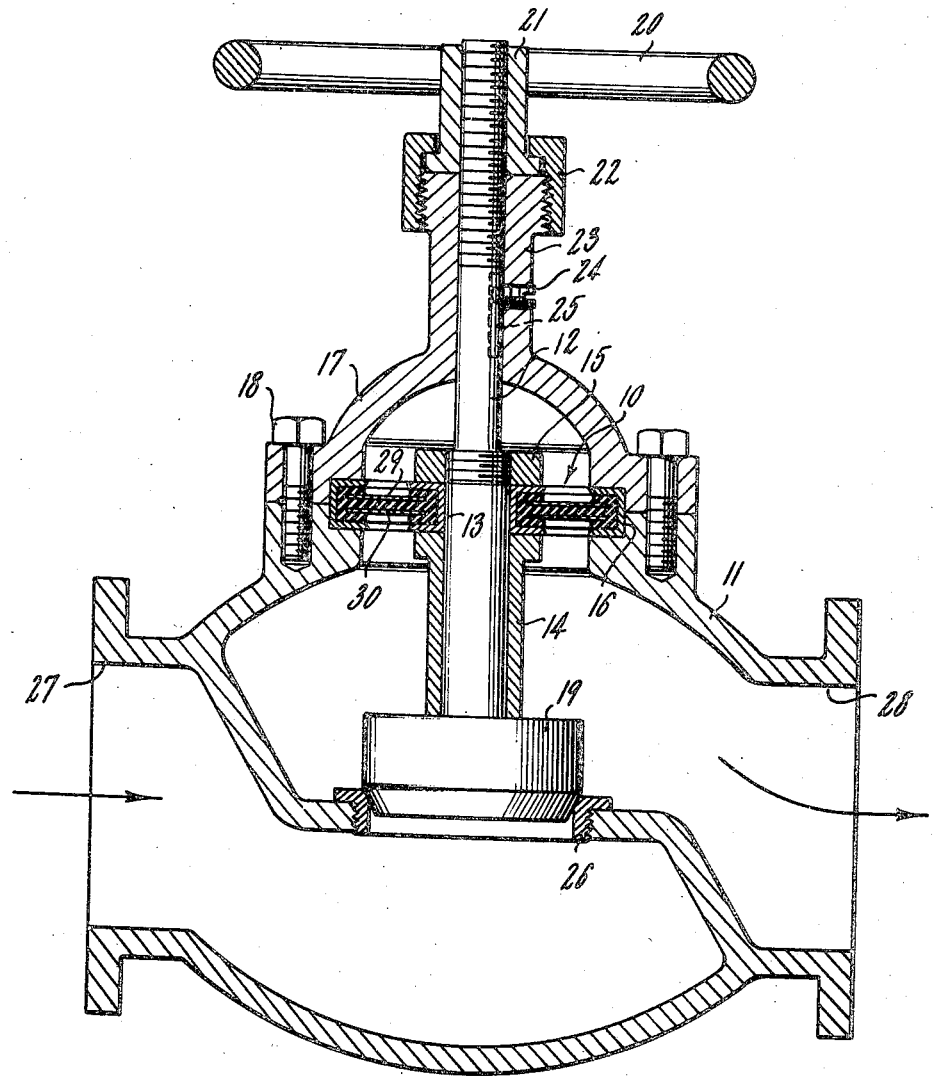
Fig. 1 is a cross-sectional view of a flexible diaphragm seal embodying this invention, and incorporated in a fluid control valve to take the place of the packing gland normally used around the reciprocable valve stem.

As shown in Fig. 1 of the drawings, the diaphragm seal 10 embodying this invention, is illustrated in a fluid pressure control valve casing 11 where it performs the function of the usual valve stem gland which seals off leakage along the valve stem 12. The inner periphery 13 of the diaphragm is secured to the valve stem 12 by a fluid tight connection comprising a nipple 14 and a nut 15, between which the periphery 13 is clamped by turning the nut downward on the threaded stem 12. The outer periphery 16 of the diaphragm seal is clamped between the valve body 11 and the cap 17 by means of the bolts 18. A sealed joint is thus formed between the inner periphery of the diaphragm seal and the valve stem 12, and between the outer periphery and the valve casing 11. The valve 19 is operated by a hand wheel 20 which is screw threaded onto the end of the valve stem 13. The hub 21 of the hand wheel is rotatably mounted on the cap 17 by a ferrule 22 which is screw threaded onto the neck 23 of the cap 17. A set screw 24 is threaded into a bore in the neck 23, and its inner end extends into an axially extending groove 25 in the stem 12 to prevent its rotation. Upon turning the hand wheel 20 the valve 19 may be moved away from and towards the valve seat 26 to control the flow of fluid from the inlet 27 of the valve body to its outlet 28. The diaphragm seal 10 closes the opening through which the valve stem 13 projects, and prevents the flow of fluid from the outlet 28 through the opening along the valve stem 13.

The details of the diaphragm seal 10 are shown in Figures 2 and 3. Fig. 2 is a plan view of the diaphragm seal 10, and Fig. 3 is a cross-sectional view with the parts shown in the position they occupy after the diaphragm has been flexed upwardly by the opening movement of the valve 19. The diaphragm comprises two sets or layers 29 and 30 of reinforcing plates arranged in spaced relation along and around the axis 31 of the diaphragm. The radial edges 32 of the plates 33 in the upper set 29 overlap the radial edges 34 of the plates 35 in the lower set 30. The space between the overlapping edges of the plates 33 and 35 are filled with rubber 36 which is bonded to the overlapping surfaces of the plates. The inner and outer peripheries 37 and 38, respectively, of the plates 33 and 35 are anchored in inner and outer channel shaped rings 39 and 40, respectively, by means of rubber 41 contained in the channels 42 and 43 in the rings 39 and 40, into which the inner and outer peripheries or ends of the plates 33 and 35 extend. The rubber 41 extends around the outer and inner peripheries of the plates, and is bonded to the surfaces of the plates and the channels 42 and 43 of the retaining rings. The rubber 41 forms a part of the body of the rubber 36 between the plates 33 and 35, and is also bonded thereto. The rubber 36, 41 forms a flexible seal between the radiating edges of the metal reinforcing plates 33, 35 and between the ends of such plates and the retaining rings 39 and 40. The combination of such elements forms a flexible impervious diaphragm.

As shown in Fig. 2, successive layers of the diaphragm seal are cut away to expose the internal construction of the diaphragm to view. The step-down cuts extend in a clockwise direction from the irregular lines 44—45, along which the top flanges of the inner and outer retaining rings 39 and 40 are cut away, leaving the rubber 41 in the channels 42 and 43 exposed to view. The second step down cut is made along the lines 46 and 47, which removes the rubber 41 in the channels to the level of the top plates 33, and leaves the inner and outer peripheries of the top plates exposed to view. The next step down cut is made along the line 48 through the overlapping portion of the top plate 33, leaving an opening 49 through the diaphragm between the adjacent bottom plates 35, and the rubber 36 interposed between the overlapping edges of the plates exposed to view. The next step down cut is made along the lines 50 and 51 down to the level of the top surface of the lower plate 35, leaving the top surface of the lower plate and the open space 49 exposed up to the irregular line 52, where the original top surface of the diaphragm reappears and continues to the lines 44 and 45.

In the operation of the diaphragm, the inner retaining ring 39 is moved relatively in respect to the fixed ring 40 along the axis 31 of the diaphragm 10, and the rings maintain their parallel relation to each other. During such movement, the overlapping edges of the plates in the separate layers 29 and 30 slide radially over each other through a small distance, and subject the rubber therebetween to shear stresses, and the rubber at the inner and outer peripheries of the plates is subjected to compression stresses. The rubber has sufficient elasticity and strength of adhesion to the metal parts to permit such movement and maintain a fluid tight seal between such parts. The rubber being elastic, it provides suitable flexibility in the diaphragm for movement of its center along its axis 31, and as the load imposed on the diaphragm by the fluid pressure subjects the rubber to compression stresses, the strength of the bond between the rubber and the metal parts is increased, and the rubber is also stressed in the direction of its greater strength.

The terms "rubber," or "rubber composition" has been used herein to designate a suitable material which may be employed to bond the reinforcing parts of the diaphragm together and form a seal therebetween, and as used the terms include impervious, flexible, elastic rubber-like material of either a natural, or synthetic nature, which may be strongly bonded to the reinforcing parts by the well known processes.

While this invention has been described more or less in detail herein, it will be understood that changes may be made in the diaphragm seal as described herein without departing from the spirit of the invention and the scope of the appended claims.

Having thus described my invention, what I claim and desire to protect by Letters Patent is:

1. A flexible diaphragm seal comprising sets of plates arranged in spaced relation along the axis of said seal, said plates in each set being arranged around the axis of said seal, each plate in each set having its radial edges overlapping the radial edges of plates in the adjacent set, elastic rubber-like material interposed between and bonded to said overlapping edges of said plates, and elastic rubber-like material extending around and bonded to the outer and inner peripheries of said plates and to said rubber-like material between said plates.

2. A flexible circular diaphragm seal comprising sets of rigid sector-shaped plates arranged in spaced relation along the axis of said seal, said plates in each set being arranged in spaced relation around the axis of said seal, each plate in each set having its radial edges overlapping the radial edges of plates in the adjacent set, elastic rubber-like material interposed between and bonded to said overlapping edges of said plates, elastic rubber-like rings of material extending around and bonded to the outer and inner peripheries of said plates and to said rubber-like material between said plates and adapted to form sealed connections between said seal and members for retaining and flexing said diaphragm.

3. A flexible circular diaphragm seal comprising sets of rigid sector-shaped plates, each of said sets being spaced in axial relation to the other along the axis of said diaphragm, and the plates of each set being spaced around the axis of said seal, each plate of each set having its radial edges overlapping the radial edges of plates in the adjacent set, elastic rubber-like material interposed between and bonded to said overlapping edges of said plates, a rigid retaining ring surrounding the outer periphery of the edges of said plates, elastic rubber-like material extending around the outer peripheries of said plates and bonded to said peripheries and to said outer ring, an inner ring surrounding the inner periphery of said plates, an elastic rubber-like material interposed between said inner periphery of said plates and said ring and bonded to said members.

4. A flexible circular seal comprising sets of sector-shaped plates, each of said sets being spaced in axial relation to the other along the axis of said seal, and the plates of each set being spaced around the axis of said seal, each plate of each set having its radial edges overlapping the radial edges of plates in the adjacent set, elastic rubber-like material filling the space between and bonded to said overlapping edges of said plates, a rigid retaining ring surrounding the outer periphery of the edges of said plates, elastic rubber-like material extending around the outer peripheries of said plates and bonded to each side of said peripheries and to said outer ring, a rigid inner ring surrounding the inner periphery of said plates, an elastic rubber-like material enveloping said inner periphery of said plates and bonded to said plate and to said ring.

JOSEPH W. DEVORSS, Jr.

REFERENCES CITED

The following references are of record in the file of this patent:

UNITED STATES PATENTS

| Number | Name | Date |
|---|---|---|
| 721,324 | Bayner | Feb. 24, 1903 |